Dec. 13, 1966  H. SCHINDLER  3,292,079
PROBE DEVICE FOR ELECTRIC PLASMA MEASUREMENTS
Filed April 2, 1963  3 Sheets-Sheet 3

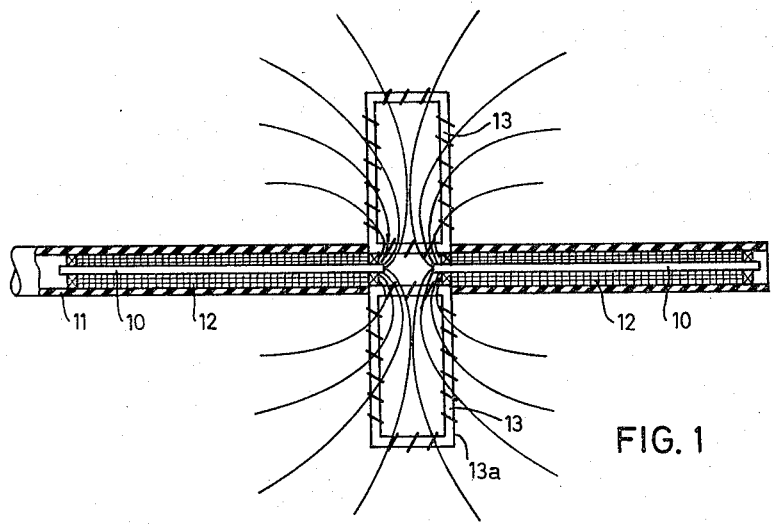
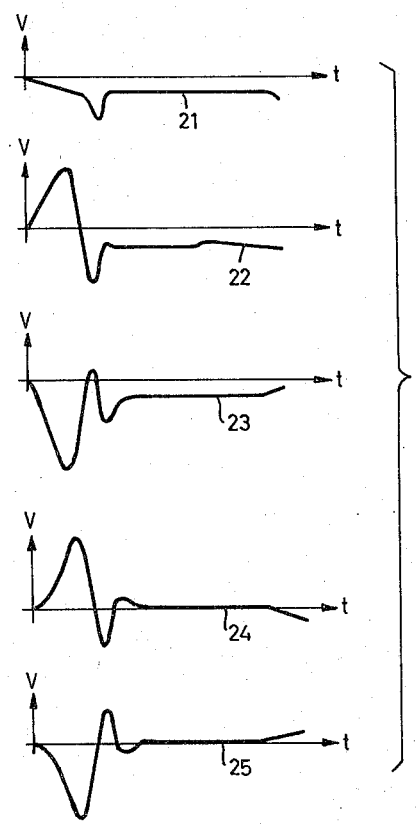
FIG. 1
FIG. 2

United States Patent Office 3,292,079
Patented Dec. 13, 1966

3,292,079
PROBE DEVICE FOR ELECTRIC PLASMA MEASUREMENTS
Heinrich Schindler, Erlangen, Germany, assignor to Siemens-Schuckertwerke Aktiengesellschaft, Berlin-Siemensstadt, Germany, a corporation of Germany
Filed Apr. 2, 1963, Ser. No. 269,960
Claims priority, application Germany, Apr. 4, 1962, S 78,883
5 Claims. (Cl. 324—40)

My invention relates to probe-type sensing and measuring devices for responding to a flow of an electrically conducting fluid medium, such as constituted by a plasma.

For this purpose conventional coil-type probes are of limited applicability. Alone, probes of the known type are unable to determine the electric conductance and the radial velocity of a plasma in a linear shock-current discharge. These small probes, consisting of induction coils housed in a quartz tube and brought radially into the discharge path, respond primarily to the change in azimuthal magnetic flux $B\varphi$ causes by the plasma discharge current. Assuming cylinder-symmetrical conditions in the discharge field, the flux change thus measured permits calculating therefrom, with the aid of Maxwell's exations, the radial distribution of the magnetic field $B\varphi$, the current density $j$, and the induced electric field strength $\epsilon_i$, as a function of time. These parameters are related to each other by Ohm's law:

$$j = \sigma(\epsilon_a + \epsilon_i + \epsilon_m)$$

wherein:

$j$ = current density
$\sigma$ = specific electric conductance
$\epsilon_a$ = externally applied field strength
$\epsilon_i$ = field strength induced by temporal change of discharge current
$\epsilon_m$ = field strength stemming from the motion of the medium in the magnetic field of the discharge current.

$\epsilon_a$ is obtained from the voltage measured at the electrodes with the aid of an induction-less voltage divider, after dividing the voltage value by the length of the discharge path.

$\epsilon_i$ is determined from measurements with coil probes.

$\epsilon_m = v \cdot B\varphi$; the velocity $v$ in linear surge or shock discharges is radially directed, and $B\varphi$ is the azimuthal magnetic field measured with coil probes. It follows from the foregoing that:

$$j = \sigma(\epsilon_a + \epsilon_i + vB\varphi)$$

$\epsilon_a$, $\epsilon_i$, $B\varphi$ and $j$ can be determined by the above-mentioned measuring methods with conventional means. Thus a relation between $\sigma$ and $v$ is obtained. However, for separately determining these two parameters a second equation is necessary.

It is an object of my invention to furnish a measuring probe device capable of furnishing the magnitude from which an individual determination of the electric plasma conductance and the electric plasma speed can be obtained.

Another object, stated more specifically than above, is to provide a probe device for measuring the product of electric conductance and speed of an electrically conducting, moving fluid medium.

Still another object of my invention is to provide a measuring probe that readily permits excluding any spurious or extraneous influences from the desired measuring result.

It is also an object of my invention to devise a measuring probe of the type mentioned above, that can be used in high-temperature plasma discharges, and affords determining the desired magnitude as a function of time at a selected and locally limited spot within such a discharge.

To achieve these objects and in accordance with a feature of my invention, a probe for measuring purposes of the above-mentioned kind comprises an insulating tube in which two opposingly poled magnetic field members are mounted in axial alignment and spaced from each other to form an intermediate field gap. Mounted on the insulating tube in the field produced by the field members and issuing from the just-mentioned gap is at least one Rogowski-type probe coil whose sensing area extends transverse to a radial plane of the tube and whose output leads provide the measuring voltage when the probe is exposed to a flow of fluid electric medium such as a plasma discharge. As will appear more fully from the following, the two opposingly poled field members produce an auxiliary field which is rotationally symmetrical about the field axis.

When charged particles, such as in the plasma, pass outwardly of the insulating tube toward the sensing coil at a velocity component $v$ in the axial direction, such charge carriers are laterally deflected by the component of the magnetic auxiliary field that is perpendicular to the axial direction. Thus a closed-loop current is induced in the plasma along a closed-loop path linking sensing coil and constituting a measure of the product formed by the conductance times the speed of the charge carriers in the axial direction at the sensing location. This loop current can be determined from the voltage which its change induces in the sensing coil.

The above-mentioned and further objects, advantages and features of my invention, said features being set forth with particularity in the claims annexed hereto, will be apparent from, and will be described in, the following with reference to an embodiment of a probe device according to the invention illustrated and explained by way of example on the accompanying drawings in which:

FIG. 1 is a schematic and partly sectional lateral view of the probe device.

FIG. 2 is an explanatory diagram showing a group of voltage-time curves relating to the operation of the same device.

Figure 3:
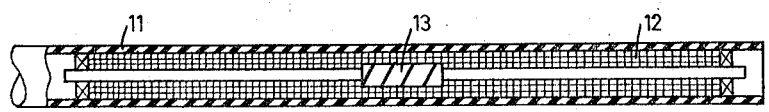
FIG. 3 is a sectional plan view of the device.

The illustrated device comprises an elongated protective tube 11 of insulating, preferably vitreous material such as quartz or quartz glass. Tightly enclosed within the tube 11 are two coaxially aligned windings 12 for producing an auxiliary magnetic field. The windings are wound in mutually opposed sense and are spaced from each other a few millimeters to produce an intermediate magnetic field between respective poles of the same magnetic polarity, the field being schematically indicated in FIG. 1 by field lines. For increasing the auxiliary field it is preferable to provide the windings 12 with respective ferromagnetic cores 10. In the gap area between the two field windings 12 the insulating tube 11 is provided with one or more longitudinal slots. If more than one slot is provided, the slots are preferably arranged diametrically opposite each other. Inserted into the tube wall through the slot is at least one Rogowski-type coil 13 to serve as sensing coil, firmly cemented to the tube 11 by insulating adhesive.

In order to minimize or virtually eliminate disturbances in the plasma discharge in which the probe device is to be used, it is desirable to keep the cross section of the insulating tube 11 as small as feasible, this being exemplified by the dimensions described hereinafter.

Aside from imparting mechanical strength to the device, the insulating tube 11 serves for electrically insulating the field windings 12 and the electric leads of the sensing coils 13 from the plasma medium which during use of the device surrounds the tube 11. The insulating tube 11 thus prevents the occurrence of electric breakdown. It also prevents impurities from passing from within the probe device into the plasma medium. The same requirements are more difficult to meet with respect to the sensing coils 13. Preferably used are two matched sensing coils shown on the drawing. These coils extend radially away from the protective tube 11 in an axial plane of the device. Such sensing coils (often called Rogowski coils after their originator; see F. Kohlrausch, Praktische Physik, vol. 2, page 220, last paragraph) are closed-loop coils which may be given any shape as long as they are closed about an area as exemplified by the arrangement of the helical turns apparent from FIG. 1. The turns of the sensing coil in the illustrated device (turns 13$b$, FIGS. 1, 4) are wound upon a rigid frame 13$a$ of insulating material whose opening defines the area surrounded by the totality of closed-loop turns. The sensing coil is preferably not given an iron core in order to permit measuring fast changing phenomena.

Changes of currents that pass through the area surrounded by the sensing coil cause correspondingly changing magnetic fields. These induce in the sensing coil a voltage $V=Ld1/dt$ or the integral $\int Vdt=LI$. Consequently, the current can be determined from the time integral of the voltage. Magnetic fields caused by currents that do not flow within the area surrounded by the sensing coils are not responded to.

For electrically insulating the sensing coils 13 from the fluid medium in which they are to be used, for example from the discharge within the plasma, they are preferably coated with synthetic plastic. To prevent the coating from vaporizing off, it is preferably given an external coat of a ceramic material.

A considerable reduction of the error signal is obtained by performing these measuring operations simultaneously with two sensing coils as embodied in the illustrated probe device. The two sensing coils are matched as well as feasible and are interconnected in such a manner that the voltages induced in the sensing coil by the discharge current, flowing in the same sense through the sensing areas of both coils, are subtractively related to each other. The annular flow of current, however, induced by the auxiliary field, passes through the area of one sensing coil in a different sense than through the other so that the respective two voltages resulting therefrom in the sensing coils are additive. This makes it possible to perform $\sigma \cdot v$ measurements in moving fluid media, for example plasmas, in which their flow currents are several powers of ten larger than the induced annular flows of current.

Figure 4:
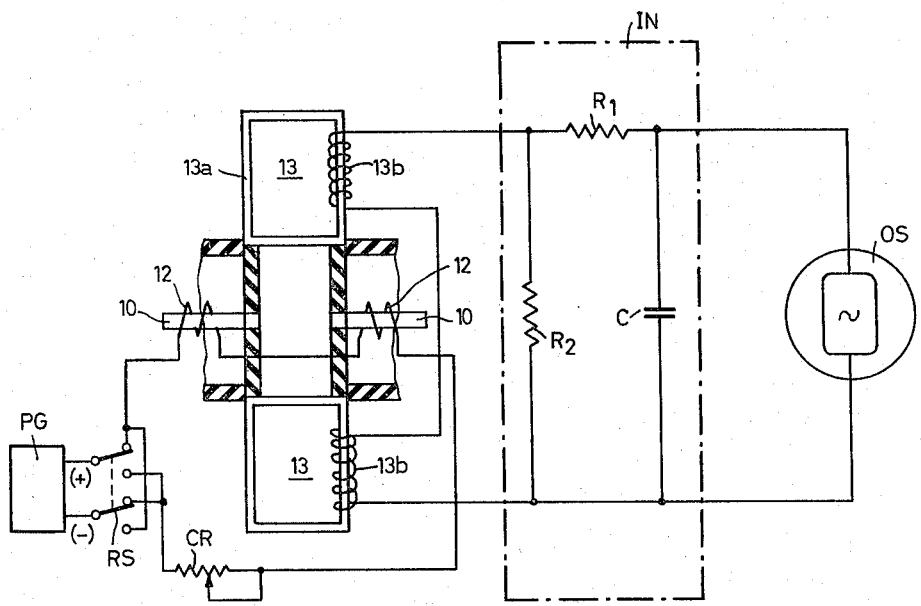
FIG. 4 shows part of the device in section together with its electric circuit diagram.

A measuring circuit of the kind just mentioned is exemplified in FIG. 4. The windings 12 for producing the auxiliary field are shown connected in series to a pulse generator PG through a reversing switch RS and a control rheostat CR. The turns 13$b$ of the sensing coils 13 are series connected to an oscillograph OS through an integrating circuit IN comprising resistors $R_1$, $R_2$ and a capacitor C. The signal voltages shown in FIG. 2 and further described below correspond to those that become visible on the screen of the oscillograph OS. These indicated signals represent the time dependence of the annular current passing through the sensing area surrounded by the sensing coils, this annular current being proportional to the product $\sigma \cdot v$. Consequently with the proper calibration, the oscillograph directly permits read-out of the product $\sigma \cdot v$.

Figure 5:
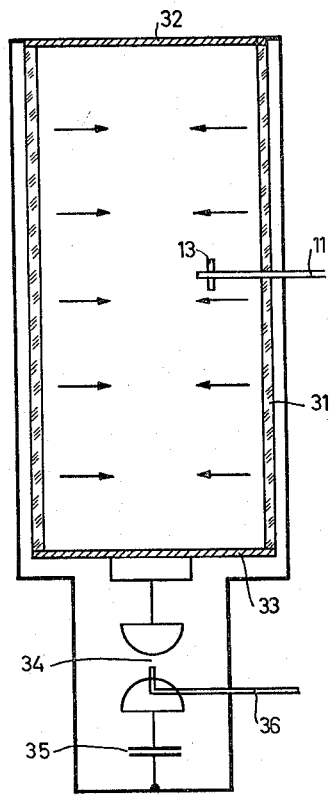
FIG. 5 shows schematically the application of the device as a measuring probe in a linear pinch discharge.

The particular signals represented in FIG. 2 were obtained for a hydrogen plasma. Used as a discharge vessel was a cylinder 31 of quartz glass according to FIG. 5. The inner diameter of the vessel was 20 cm. The ends of the cylinder were closed by electrodes 32 and 33 which were connected to a capacitor battery schematically represented at 35. Discharge of the battery was triggered by a spark gap 34 with the aid of the trigger electrode 36. The resulting direction of plasma motion is indicated in FIG. 5 by arrows. The probe-type device according to the invention is inserted into the plasma discharge at the desired location also as shown in FIG. 5. The voltage impressed across the discharge path was 14 kv., and the maximum discharge current 150 ka. The magnetic field produced by the discharge current itself had a magnitude of about 5 kg.

The probe device was radially inserted into the discharge path according to FIG. 5. The probe dimensions were as follows. The auxiliary field windings 12 had a length of 4 cm. each and 2000 turns each, consisting of varnished copper wire having a diameter of 0.1 mm. The diameter of each field winding 12 was about 3 mm. The diameter of the quartz tube 11 in which the field windings were mounted was 5 mm. (external). Employed as sensing coils were two rectangular Rogowski coils of which the longer side was 2 cm. and the shorter side 1 cm. long. Each measuring coil was provided with 50 turns of varnished copper wire of 0.2 mm. diameter. The auxiliary field windings 12 were energized by current of 10 amps., producing a maximal auxiliary field of 200 gauss. The auxiliary field current was pulsating and passed through the windings 12 only for a few microseconds per pulse.

Figure 6:
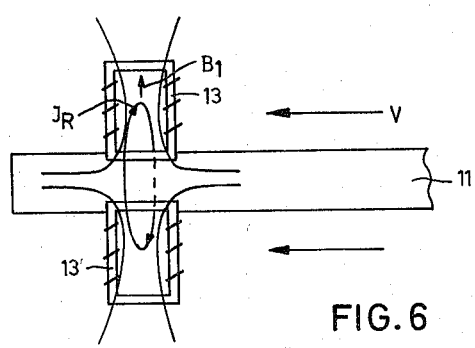
FIG. 6 is an explanatory diagram relating to FIG. 5.

Referring to FIGS. 5 and 6, the plasma flows at the speed $v$ along the outside of the probe tube 11. At the location of the sensing coils 13, the charge carriers of the plasma become deflected by the Lorentz force. This results in the occurrence of a ring-shaped flow of current $I_R$ (FIG. 6) in the plasma which passes through the sensing area of the coils 13 and thus induces a corresponding voltage in the coils. The annular current $I_R$ is proportional to the product of conductance times speed: $\sigma \cdot v$.

Reverting now to FIG. 2, the curves denoted by 21 through 25 denote voltage versus time ($t$). The curve 21 corresponds to the measured probe voltage which results from the plasma discharge current without applying an auxiliary field. The signal 21 therefore is entirely an error signal. The probe signal 22 is composed of the error signal 21 and the signal resulting from the application of the auxiliary field. By reversing the polarity of the auxiliary field (with the aid of the switch RS, FIG. 4) the probe signal 23 is obtained. In order to eliminate the error signal 21 from the measuring performance, the differences of signals 21 and 22 or 23 are formed. These differences are represented by respective signals 24 and 25. They constitute the temporal and spacial dependence of the product $\sigma \cdot v$ in the interior of the plasma.

The magnetic auxiliary field may also be produced by two permanent magnets in lieu of the field windings 12. The arrangement of these magnets in the insulating tube 11 then corresponds to that illustrated and described with respect to the field windings 12 and their respective cores 10. However, since permanent magnets cannot be reversed as to their magnetic poling, it is preferable to employ the illustrated field windings together with an energizing circuit that comprises a polarity reversing switch.

The probe device according to the invention permits determining the measuring data at any locality of interest, as a function of time. It permits determining a spacial distribution of the time functions of speed and conductance because the measuring result is not obtained by averaging over a relatively large volume.

By employing two or more sensing coils, a probe device according to the invention can be employed not only in current-free but also in current-carrying media. Due to the possibility of reversing the polarity of the magnetic auxiliary field, the signals obtained from the probe device can readily be checked for elimination of extraneous or spurious effects.

A considerable advantage also resides in the fact that the probe device according to the invention is applicable without danger at localities of high electric potential.

A single sensing coil suffices for performing measurements in current-free media. In shock discharges, for example plasma pinch discharges, however, there occur extremely intensive currents which pass through the area of the sensing coil and thus produce a signal even without the use of the auxiliary magnetic field. The induced annular current flow (caused by the interaction of the plasma flow with the auxiliary field of the two field windings 12) is to be very small in comparison with the plasma discharge current in order not to change the character of the discharge. This means that the error signal stemming from the discharge current must be much larger than the measuring signal produced by the induced annular flow of current. The magnitude of the error signal can be changed by turning the probe about the axis of the field windings because only the area component of the sensing coil parallel to the current-flow direction in the plasma is effective.

To those skilled in the art it will be obvious, upon a study of this disclosure, that my invention permits of various modifications, particularly as regards design details and circuitry, and hence can be given embodiments other than particularly illustrated and described herein, without departing from the essential features of my invention and within the scope of the claims annexed hereto.

I claim:

1. Probe for measuring the product of electric conductance times speed of a moving fluid electric medium, comprising an insulating tube, two opposingly poled magnetic field members having respective magnetic axes aligned in said tube and being axially spaced from each other to form an intermediate field gap, and two closed-loop probe coils mounted on said tube in the field range of said gap and having respective coil-surrounded probe areas extending on diametrically opposite sides of said tube in a common axial plane, said probe coils having output leads for providing measuring voltage when the probe is exposed to a flow of the medium.

2. Probe for measuring the product of electric conductance times speed of a moving fluid electric medium, comprising an insulating tube, two opposingly poled magnetic field members having respective magnetic axes aligned in said tube and being axially spaced from each other to form an intermediate field gap, said tube having a longitudinal wall slot at said gap, and a closed-loop probe coil mounted on said tube and extending through said longitudinal slot, said coil extending radially outward from said tube and having a coil-surrounded probe area substantially in the axial plane of said tube determined by said slot, said probe coil having output leads for providing measuring voltage when the probe is exposed to a flow of the medium.

3. Probe for measuring the product of electric conductance times speed of a moving fluid electric medium, comprising an insulating tube, two opposingly poled magnetic field members having respective magnetic axes aligned in said tube and being axially spaced from each other to form an intermediate field gap, and a Rogowski-type probe coil mounted on said tube in the field range of said gap and having a coil-surrounded probe area extending transverse to a radial plane of said tube, said probe coil having output leads for providing measuring voltage when the probe is exposed to a flow of the medium, said insulating tube being formed of vitreous material and having a longitudinal slot in the tube wall at said field gap, said probe coil having an insulating loop-shaped support of rigid material and having coil turns distributed over substantially the entire loop length of said support, said support having a turn-carrying portion extending in said gap.

4. In a measuring probe according to claim 3, said tube being formed of quartz.

5. In a measuring probe according to claim 3, said probe coil having an insulating coating of ceramic material.

References Cited by the Examiner

UNITED STATES PATENTS

| | | | |
|---|---|---|---|
| 2,435,043 | 1/1948 | Lehde et al. | 324—40 X |
| 2,958,835 | 11/1960 | Kolb. | |
| 3,152,303 | 10/1964 | Lary et al. | 324—36 X |

RUDOLPH V. ROLINEC, *Primary Examiner.*

WALTER L. CARLSON, *Examiner.*

A. E. RICHMOND, *Assistant Examiner.*